(12) United States Patent
Xiao

(10) Patent No.: US 9,152,174 B2
(45) Date of Patent: Oct. 6, 2015

(54) COMPUTER SYSTEM

(71) Applicant: Yunfei Xiao, Flushing, NY (US)

(72) Inventor: Yunfei Xiao, Flushing, NY (US)

( * ) Notice: Subject to any disclaimer, the term of this patent is extended or adjusted under 35 U.S.C. 154(b) by 170 days.

(21) Appl. No.: 13/801,770

(22) Filed: Mar. 13, 2013

(65) Prior Publication Data

US 2014/0153174 A1 Jun. 5, 2014

(30) Foreign Application Priority Data

Dec. 3, 2012 (CN) .......................... 2012 1 0507252

(51) Int. Cl.
*G06F 1/16* (2006.01)
*G06F 3/02* (2006.01)
*G06F 3/023* (2006.01)

(52) U.S. Cl.
CPC ............ *G06F 1/1601* (2013.01); *G06F 3/0202* (2013.01); *G06F 3/023* (2013.01); *A47B 2200/0073* (2013.01)

(58) Field of Classification Search
CPC .... G06F 1/16; A47B 21/007; A47B 21/0073; A47B 21/03; A47B 21/00; A47B 2200/0073; A47B 2200/0066; A47B 2021/0076; A47B 2021/0364
USPC ........................ 361/679.01–679.27, 728, 729; 248/917–924, 694; 312/223.3, 21, 26
See application file for complete search history.

(56) References Cited

U.S. PATENT DOCUMENTS

| | | | | |
|---|---|---|---|---|
| 4,766,422 A * | 8/1988 | Wolters et al. | ................ | 312/198 |
| 5,889,510 A * | 3/1999 | Klarlund | ........................ | 345/168 |
| 7,100,516 B2 * | 9/2006 | Riddiford et al. | .......... | 108/50.01 |
| 8,749,959 B2 * | 6/2014 | Riley et al. | ............... | 361/679.02 |
| 2005/0110780 A1 * | 5/2005 | Ditzik | ........................... | 345/179 |
| 2007/0012823 A1 * | 1/2007 | Hubbard | ....................... | 248/118 |

* cited by examiner

*Primary Examiner* — Jenny L Wagner
*Assistant Examiner* — Ahmad D Barnes
(74) *Attorney, Agent, or Firm* — Troutman Sanders LLP

(57) ABSTRACT

A computer system includes a desk, and a first display and a first keyboard arranged on a desk panel of the desk and flexibly connected to the desk panel. The panel board includes at least two layers; an edge of a top layer of the panel board is flexibly connected to a second layer of the panel board; a lower surface of the top layer of the panel board is used as a second display and an upper surface of a second layer of the panel board is used as a second keyboard; and the first display, the first key board, the second display, and the second keyboard are all connected to the computer. The computer system of the present disclosure effectively protects eye sights, reduces the probability of shortsightedness, greatly increases the amount of exercise, consumes unnecessary energy, reduces the storage of energy and production of fat, further results in loss of weight, and at the same time strengthens physical exercise and improves health states.

10 Claims, 2 Drawing Sheets

COMPUTER SYSTEM

BACKGROUND

1. Technical Field

The present disclosure relates to technologies of computers and, particularly, to a new computer system.

2. Description of Related Art

Owing to the coming of the information and computer age, almost all of the students and white-collar workers need a computer. They always sit in the school or the office for 7 or 8 hours, keeping their eyes on the small displays of the computers all the time, which may cause shortsightedness. Furthermore, their necks are kept immobile, which may cause cervical spondylosis. What is worse it that after meal they just use their fingers before their computers without doing any exercise, which may cause fat body and increase the probability of hypertension, heart disease, and so on. All of these violate natural rules of a human being, that is, the body of a human being needs an appropriate amount of exercise, greatly increase the fee of social insurance for medical care which is unaffordable to the country, and make the people become fat and ugly and further result in a vicious cycle of the psychology and physiology.

SUMMARY

The present disclosure provides a computer system for strengthening exercise and improving health.

The computer system provided in the present disclosure includes a desk, and a first display and a first keyboard arranged on a desk panel of the desk and flexibly connected to the desk panel; the panel board includes at least two layers; an edge of a top layer of the panel board is flexibly connected to a second layer of the panel board; a lower surface of the top layer of the panel board is used as a second display and an upper surface of a second layer of the panel board is used as a second keyboard; and the first display, the first key board, the second display, and the second keyboard are all connected to the computer.

Preferably, a left key and a right key are respectively configured on two front legs of the desk, and both the left key and the right key are electrically connected to the second keyboard.

Preferably, the left key is a space key, and the right key is a delete key.

Preferably, the computer system further includes at least one tread key allowing for information input when being trodden, and the at least one tread key is arranged on the floor and is electrically connected to the second keyboard.

Preferably, the computer system further includes a chair assorted with the desk, and at least one external key is arranged beside the chair or behind the chair.

Preferably, the computer system further includes at least one connecting block respectively corresponding to the at least one external key, each external key is arranged on one end of the connecting block, and the other end of each connecting block is connected to the chair.

Preferably, a plurality of music keys are respectively arranged under the left key, the right key, the at least one tread key, the at least one external key, and all the keys of the second keyboards.

Preferably, the desk further configures a controlling device which can at least be at a position A and a position B; when the controlling device is at position A, the second display is turned on, the first display is turned off, and all the music keys are unusable; when the controlling device is at position B, all the music keys are usable.

Preferably, the desk further includes a first buckle and a second buckle arranged on the top layer of the panel board for respectively locking the first display and the first keyboard.

Preferably, the computer is arranged in the second layer of the panel board or separated from the desk.

With the computer system, because the second display is quite large, it's easier to watch information shown on the second display. Especially for kids, they don't need to stare at a small display all the time, which protects their eye sights and reduces the probability of shortsightedness. Because the second keyboard is large, the keys on the keyboard are large too, people who have no time to do exercise and need to work with the computer for a long time can hit the keys of the second keyboard by using their fists or using hammers rather than their fingers, which greatly increases the amount of exercise, consumes more energy, reduces the storage of energy and production of fat, and finally reduces their weights. Meanwhile, for the old ages, they can hit the keys with hammers when they are enjoying their times with the computer system, which strengthens physical exercise of the old ages and improves health states of the old ages.

DESCRIPTION OF THE DRAWINGS

Many aspects of the embodiments can be better understood with reference to the following drawings. The components in the drawings are not necessarily dawns to scale, the emphasis instead being placed upon clearly illustrating the principles of the embodiments. Moreover, in the drawings, like reference numerals designate corresponding parts throughout the several views.

FIG. 1 (b) is similar to FIG. 1 (a), with the second display of the computer system being opened;

DETAILED DESCRIPTION

The disclosure is illustrated by way of example and not by way of limitation in the figures of the accompanying drawings in which like references indicate similar elements. It should be noted that references to "an" or "one" embodiment is this disclosure are not necessarily to the same embodiment, and such references mean at least one.

Figure 1:
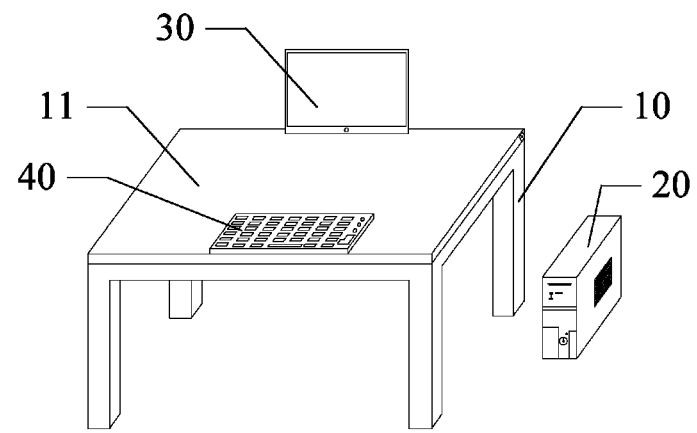
FIG. 1 (a) is a schematic view illustrating a computer system with a second display thereof being closed in accordance with a first embodiment of the present disclosure.
Figure 1:
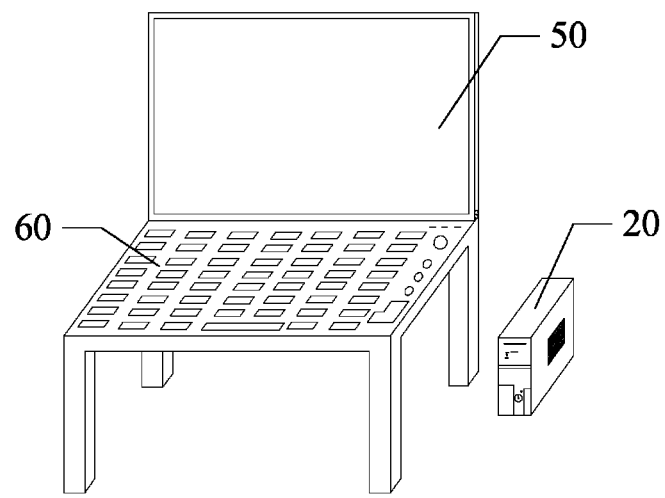

Referring to FIG. 1 (a) and FIG. 1 (b), in which FIG. 1 (a) is a schematic view illustrating a computer system with a second display thereof being closed in accordance with a first embodiment of the present disclosure, and FIG. 1 (b) is similar to the FIG. 1 (a), but with the second display of the computer system being opened.

The computer system includes a desk 10, a computer 20, a first display 30, and a first keyboard 40. Both the first display 30 and the first keyboard 40 are arranged on a panel board 11 of the desk 10 and are flexibly connected to the panel board 11. The panel board 11 has at least two layers. One edge of a top layer of the panel board 11 is flexibly connected to the second layer of the panel board 11, and a lower surface of the top layer of the panel board 1 is used as a second display 50. An upper surface of a second layer of the panel board 11 is used as a second keyboard 60. The first display 30, the first keyboard 40, the second display 60, and the second keyboard 60 are electrically connected to the computer 20.

In this exemplary embodiment, the panel board 11 has two layers, and the computer 20 and the desk 10 are separated from each other. It is noted that the computer 20 can be arranged in the second layer of the panel board 11 of the desk 10. In this computer system, when the top layer of the panel board 11 is folded on the second layer of the panel board 11, the second display 50 is turned off, and the first display 30 and the first keyboard 40 are usable. When the top layer of the panel board 11 is rotated around its edge to be vertical, the second display 50 is turned on, and the second display 50 and the second keyboard 60 are usable. Since the lower surface of the top layer of the panel board 11 is used as the second display 50 and the upper surface of the second layer of the panel board 11 is used as the second keyboard 60, thus, both the second display 50 and the second keyboard 60 are quite large. Since the second display 50 is quite large, the information showed on the second display 50 can be watched clearly. Especially for kids, they don't need to stare at a small display all the time, which protects their eye sights and reduces the probability of shortsightedness. Because the second keyboard 60 is large, the keys on the keyboard 60 are large too, people who have no time to do exercise and need to work with the computer for a long time can hit the keys on the second keyboard 60 by using their fists or using hammers rather than their fingers, which greatly increases the amount of exercise, consumes more energy, reduces the storage of energy and production of fat, and finally reduces their weights. Meanwhile, for the old ages, they can hit the keys with hammers when they are enjoying their times with the computer system, which strengthens physical exercise of the old ages and improves health states of the old ages.

Figure 2:
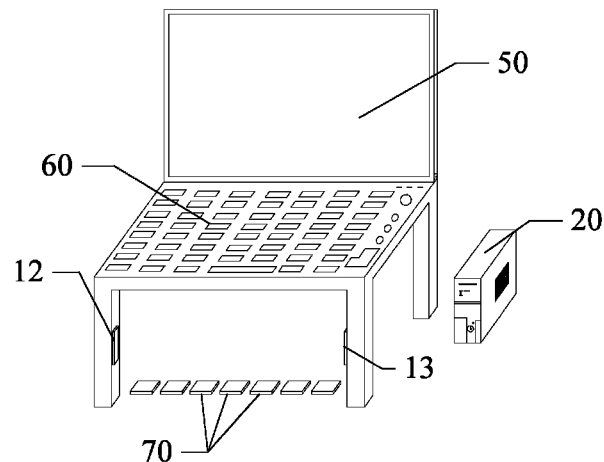
FIG. 2 is a schematic view illustrating a computer system in accordance with a second embodiment of the present disclosure.

Referring to FIG. 2, which is a schematic view illustrating a computer system in accordance with a second embodiment of the present disclosure. In this exemplary embodiment, a left key 12 and a right key 13 are respectively arranged on two front legs of the desk 10. When using the computer system, people can press the left key 12 and the right key 13 by abutting their knees against the keys. In this way, people can increase the amount of exercise of their legs and the whole body when using the computer system. In this exemplary embodiment, the left key 12 is a space key and the right key 13 is a delete key. Both the space key and the delete key are high-frequency-used keys, so that the frequency of the exercise of legs is increased. The new computer system further includes at least one tread key 70 which is arranged on the floor and electrically connected to the second keyboard 60. The at least one tread key 70 allows for information input when being trodden. In this way, people can increase the exercise of their feet and legs by treading the at least one tread key 70 when using the computer system, which also increases the amount of exercise of the whole body. Thereafter, the computer system in this embodiment increases the exercise of people's legs and the amount of exercise of the whole body, allowing the ladies to keep slim legs and have a better figure and allowing the men to become stronger, improving people's health, and helping people get rid of weaknesses and illnesses, and reducing medical expenses.

Figure 3:
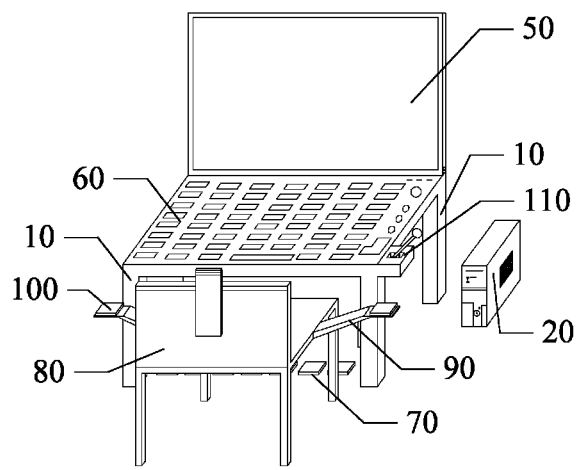
FIG. 3 is a schematic view illustrating a computer system in accordance with a third embodiment of the present disclosure.

Referring to FIG. 3, which is a schematic view illustrating a computer system in accordance with a third embodiment of the present disclosure. In this exemplary embodiment, the new computer system further includes a chair 80 assorted with the desk 10. At least one external key 100 is arranged beside the chair 80 or behind the chair 80. The new computer system further includes at least one connecting block 90 respectively corresponding to the at least one external key 100. Each external key 100 is fixed at one end of the corresponding connecting block 90, and the other end of the connecting block 90 is fixed to the chair 80.

In this exemplary embodiment, the computer system includes a number of external keys 100 and the external keys 100 are respectively arranged beside the chair 80 and behind the chair 80. It is noted that the external keys 100 can be arranged just beside the chair 80 or behind the chair 80, and the number of the external keys 100 can be greater in other embodiments. At present, many computer users are easy to suffer cervical spondylosis. In this embodiment, the external keys 100 are arranged beside and behind the chair 80 and each external key 100 can be programmed to perform the function of a normal key of the keyboard to increase the using frequency of the external keys 100. In this way, people have to wriggle their necks and waists to press the external keys 100, which exercises their necks to reduce opportunity of cervical spondylosis and exercises their waists to reduce extra meet.

In this exemplary embodiment, the computer system may include a number of music keys respectively arranged under the left key 12, the right key 13, the at least one tread key 70, the external keys 100, and the second keyboard 60. A controlling device 110 is arranged on the desk 10. The controlling device 110 can at least be at two positions, including position A and position B. When the controlling device 110 is at position A, the second display 50 is turned on, the first display 30 is turned off, and all the music keys are unusable. When the controlling device 110 is at position B, all the music keys are usable. A first buckle and a second buckle are respectively arranged on an upper surface of the top layer of the panel board 11 for respectively locking the first display 30 and the first keyboard 40.

When the controlling device 110 is at position A, the second display 50 is opened to be vertical, the first display 30 is closed and is locked by the first buckle, and the first keyboard 40 is locked by the second buckle. All the music keys are unusable and the second keyboard 60 can be used as a normal keyboard. When the controlling device 110 is at position B, all the music keys are usable and the second keyboard 60 can be used as a musical keyboard. At this time, normal typing function of each key of the second keyboard 60 can be turned off or locked. The music keys can correspond to keys of an electronic organ or keys of other musical instrument. For example, when the keys of the second keyboard 60 correspond to the keys of an electrical organ, the second keyboard 60 can be used as an electrical organ, while the second display 50 broadcasts built-in or downloaded music or video courses. After that people can practice after it and do exercise in music, which allows people to do exercise and lose weights, to learn musical instrument, and to enhance musical skills. Because the second display 50 is quite large, the controlling device 110 is used for controlling the opening of the second display 50 to allow the second display 50 to be opened conveniently.

Even though information and the advantages of the present embodiments have been set forth in the foregoing description, together with details of the mechanisms and functions of the present embodiments, the disclosure is illustrative only; and that changes may be made in detail, especially in matters of shape, size, and arrangement of parts within the principles of the present embodiments to the full extend indicated by the broad general meaning of the terms in which the appended claims are expressed.

What is claimed is:

1. A computer system, comprising:
   a desk,
   a computer,
   a first display and
   a first keyboard arranged on a panel board of the desk and flexibly connected to the panel board,
   wherein the panel board comprises at least two layers; an edge of a top layer of the panel board is flexibly connected to a second layer of the panel board; a lower surface of the top layer of the panel board includes a second display and an upper surface of a second layer of the panel board includes a second keyboard; and the first display, the first key board, the second display, and the second keyboard are all connected to the computer.

2. The computer system as claimed in claim 1, wherein a left key and a right key are respectively configured on two front legs of the desk, and both the left key and the right key are electrically connected to the second keyboard.

3. The computer system as claimed in claim 2, wherein the left key is a space key, and the right key is a delete key.

4. The computer system as claimed in claim 2 further comprising at least one tread key allowing for information input when being trodden, the at least one tread key is arranged on the floor and is electrically connected to the second keyboard.

5. The computer system as claimed in claim 4 further comprising a chair assorted with the desk, and at least one external key is arranged beside the chair or behind the chair.

6. The computer system as claimed in claim 5 further comprising at least one connecting block respectively corresponding to the at least one external key, each external key is arranged on one end of the connecting block, and the other end of each connecting block is connected to the chair.

7. The computer system as claimed in claim 5 or 6, wherein a plurality of music keys are respectively arranged under the left key, the right key, the at least one tread key, the at least one external key, and all the keys of the second keyboard.

8. The computer system as claimed in claim 7, wherein the desk further configures a controlling device which can at least be at a position A and a position B; when the controlling device is at position A, the second display is turned on, the first display is turned off, and all the music keys are unusable; when the controlling device is at position B, all the music keys are usable.

9. The computer system as claimed in claim 8, wherein the desk further comprises a first buckle and a second buckle arranged on the top layer of the panel board for respectively locking the first display and the first keyboard.

10. The computer system as claimed in claim 9, wherein the computer is arranged in the second layer of the panel board or separated from the desk.

* * * * *